US012643832B2

(12) United States Patent
Velay Lizancos et al.

(10) Patent No.: US 12,643,832 B2
(45) Date of Patent: Jun. 2, 2026

(54) METHODS OF PRODUCING CONSTRUCTION ELEMENTS, CONSTRUCTION ELEMENTS PRODUCED THEREBY, AND STRUCTURES PRODUCED THEREFROM

(71) Applicant: Purdue Research Foundation, West Lafayette, IN (US)

(72) Inventors: Maria Mirian Velay Lizancos, West Lafayette, IN (US); Marina Garcia Lopez-Arias, West Lafayette, IN (US); Vito Francioso, Santa Clara, CA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/847,934

(22) PCT Filed: Apr. 18, 2023

(86) PCT No.: PCT/US2023/018966
§ 371 (c)(1),
(2) Date: Sep. 17, 2024

(87) PCT Pub. No.: WO2023/205162
PCT Pub. Date: Oct. 26, 2023

(65) Prior Publication Data
US 2025/0034053 A1 Jan. 30, 2025

Related U.S. Application Data

(60) Provisional application No. 63/331,920, filed on Apr. 18, 2022.

(51) Int. Cl.
*C04B 41/45* (2006.01)
*C04B 18/167* (2023.01)
(Continued)

(52) U.S. Cl.
CPC ........ *C04B 41/4525* (2013.01); *C04B 18/167* (2013.01); *C04B 28/04* (2013.01);
(Continued)

(58) Field of Classification Search
CPC ..... C04B 41/46; C04B 41/47; C04B 41/4523; C04B 41/4545
See application file for complete search history.

(56) References Cited

U.S. PATENT DOCUMENTS 2,288,633 A * 7/1942 Luckhaupt .............. C04B 41/46
427/398.1
3,175,927 A * 3/1965 Howard .................. C04B 41/47
427/403
(Continued)

FOREIGN PATENT DOCUMENTS

CN          108609935      10/2018
KR          20130068514     6/2013
WO          96-39295       12/1996

OTHER PUBLICATIONS

International Search Report & Written Opinion for International Application No. PCT/US2023/018966, dated Aug. 9, 2023, 10 pages.

*Primary Examiner* — Michael P Wieczorek
(74) *Attorney, Agent, or Firm* — Hartman Global IP Law; Gary M. Hartman; Domenica N. S. Hartman

(57) ABSTRACT

Processes for incorporating phase change materials (PCM) into porous construction elements, composite construction elements produced thereby, and structures constructed therefrom. Such a process includes heating a PCM to a temperature at or above a melting temperature thereof to liquify the PCM and yield a liquid PCM, fully immersing a porous construction element in the liquid PCM, and infiltrating the liquid PCM into porosity of the construction element while the construction element and liquid PCM are at a subatmo- (Continued)

22

26

24

Air leaves pores

PCM enters pores

32

20 spheric pressure level and at a temperature sufficient to maintain the PCM in a liquid state to yield a composite construction element in which the porosity of the construction element has been at least partially filled with the PCM. Such a composite construction element is preferably capable of increasing the thermal inertia of a building envelope constructed therefrom with little or no detrimental effects on properties of the construction elements.

16 Claims, 7 Drawing Sheets

(51) Int. Cl.

| | |
|---|---|
| *C04B 28/04* | (2006.01) |
| *C04B 41/00* | (2006.01) |
| *C04B 41/46* | (2006.01) |
| *C04B 41/62* | (2006.01) |
| *C09K 5/06* | (2006.01) |
| *C04B 103/00* | (2006.01) |
| *C04B 111/00* | (2006.01) |

(52) U.S. Cl.
CPC .......... *C04B 41/0072* (2013.01); *C04B 41/46* (2013.01); *C04B 41/62* (2013.01); *C09K 5/063* (2013.01); *C04B 2103/0071* (2013.01); *C04B 2111/0075* (2013.01)

(56) References Cited

U.S. PATENT DOCUMENTS

| | | | | |
|---|---|---|---|---|
| 4,259,401 | A * | 3/1981 | Chahroudi | .............. E04C 1/392 |
| | | | | 428/305.5 |
| 4,350,736 | A * | 9/1982 | Reily | .................... C04B 41/009 |
| | | | | 428/341 |
| 4,572,864 | A | 2/1986 | Benson et al. | |
| 5,215,693 | A * | 6/1993 | Lee | ........................ C04B 35/622 |
| | | | | 264/133 |
| 10,308,553 | B2 * | 6/2019 | Maslehuddin | .......... C04B 28/04 |
| 2002/0141932 | A1 | 10/2002 | Klett et al. | |
| 2012/0196040 | A1 * | 8/2012 | Wilk, Jr. | ............. C04B 41/4523 |
| | | | | 427/398.1 |

* cited by examiner

22

26

20

24

20

28

30

22

26

24

Air leaves
pores

PCM enters
pores

32

20

34

36

30

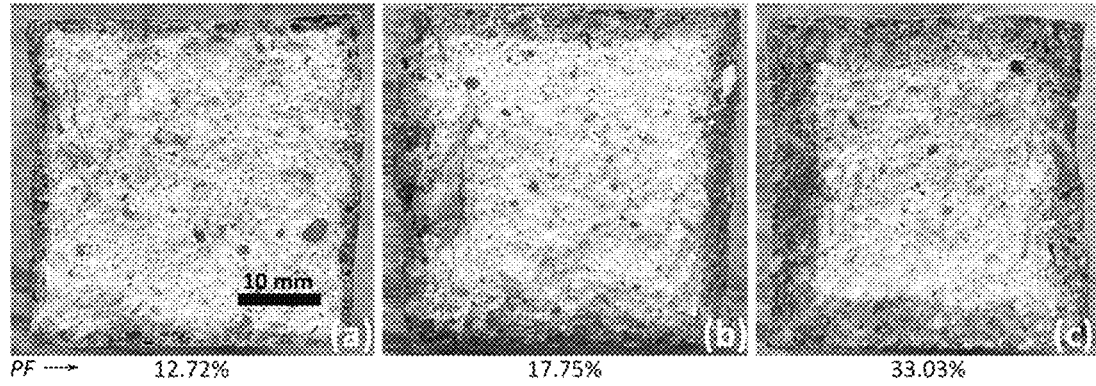
PF ⟶     12.72%                    17.75%                    33.03%
Treatment: 0.25 hr.      Treatment: 1 hr.      Treatment: 4 hrs.
FIG. 3A              FIG. 3B              FIG. 3C
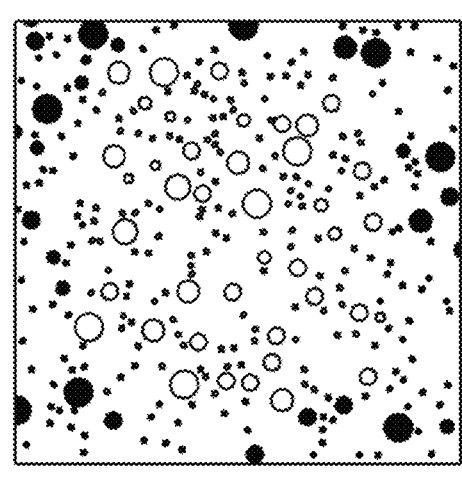
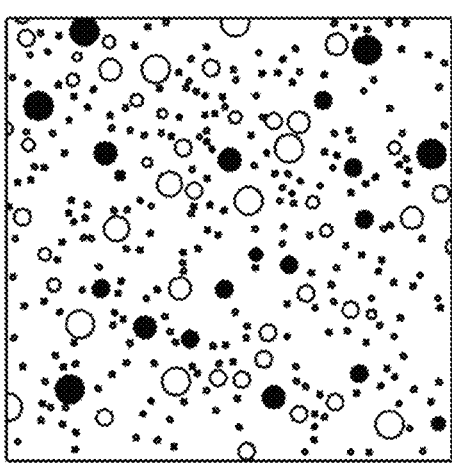
FIG. 4A                          FIG. 4B

METHODS OF PRODUCING CONSTRUCTION ELEMENTS, CONSTRUCTION ELEMENTS PRODUCED THEREBY, AND STRUCTURES PRODUCED THEREFROM

CROSS REFERENCE TO RELATED APPLICATION

This application claims priority to International Patent Application No. PCT/US2023/018966 filed Apr. 18, 2023, which claims priority to U.S. Provisional Patent Application No. 63/331,920 filed Apr. 18, 2022. The contents of these prior patent documents are incorporated by reference.

BACKGROUND OF THE INVENTION

The present invention generally relates to construction elements and methods for their production and use. The invention particularly relates to methods of producing construction elements capable of exhibiting enhanced thermal properties to reduce energy consumption of a structure in which the elements are incorporated.

According to the U.S. Energy Information Administration (EIA), more than half of energy used in homes is for heating and air conditioning. Furthermore, a report of the World Green Building Council (WGBC) estimated that the buildings and construction sector are currently responsible for between 37% and 39% of global energy-related carbon emissions, and 28% of the global energy-related carbon emissions is related to energy used for heating and cooling buildings as a result of heat transfer between buildings and their surrounding environments, which occurs within both hot (e.g., summer) and cold (e.g., winter) climates, as schematically represented in FIG. 1 as occurring through both interior structures (e.g., floors) 12 of a building 10 and through exterior structures 14 (e.g., walls and roof) of the building 10. While alternatives to fossil fuel energy such as wind and solar energy continue to be employed, developed, and expanded, their variability and intermittency drive a requirement for energy storage and greater efficiency in energy usage. Therefore, the construction of buildings having improved thermal performance would have a significant impact that would translate into a reduction of energy consumption, reduction of associated $CO_2$ emissions, and reduction of costs associated with heating and cooling buildings.

Previous studies have explored the possibility of incorporating phase change materials (PCMs) such as paraffin wax (sometimes simply referred to as paraffin) as part of the composition of concretes and other construction materials used in the construction of buildings and particular their envelopes (structures of a building directly exposed to the atmospheric environment) to yield construction elements (such as bricks, blocks, etc.) with better thermal insulation and high thermal inertia properties. As known in the art, PCMs store thermal energy and release it when the material undergoes a phase change. Specifically, these materials utilize the extra heat produced by an increase in ambient temperature to change phase (from a solid to a liquid, or from a liquid to a gas), absorbing the thermal energy and then releasing it when the ambient temperature decreases and the PCM returns to its original phase. As a result, the incorporation of PCMs into construction elements has been shown to increase the thermal inertia of the construction elements, thus improving their thermal performance.

There are a wide variety of materials that have been considered for use as PCMs in building construction, including organic paraffins ($C_nH_{2n+2}$), organic non-paraffins, and inorganic eutectics. Of the aforementioned materials, paraffin waxes have been among the most commonly used, being advantageous for their low melting temperature range suitable for thermal comfort in buildings, and their low cost. As concrete is the world's most common construction material, many studies have analyzed the effect PCMs, specifically paraffin wax, have on cementitious materials' thermal properties. Multiple studies have conclusively shown that the addition of PCM to cementitious materials increased the thermal inertia of the material, thereby increasing its thermal storage capabilities.

However, current processes for incorporating PCMs into construction materials present significant issues, side effects, and constraints, with the result that the commercial use of construction elements that incorporate PCMs has remained impracticable. For example, the use of PCMs in concrete has been associated with interference with cement hydration and reductions of mechanical properties. Examples of processes that have been considered for incorporating PCMs into construction elements have included macroencapsulation and microencapsulation. Macroencapsulation processes do not incorporate the PCMs into the material matrix, and their applicability depends on an element's geometry. Specifically, macroencapsulation processes produce a heterogeneous composite in which large cavities within a preexisting element are filled with a PCM. On the other hand, microencapsulation processes incorporate PCMs into the material matrix as a result of the PCMs being admixed during the mixing process prior to forming the element to yield a more homogeneous material. However, the addition of PCMs has been shown to interfere with the hydration process of the matrix and reduces its strength and durability. Microencapsulation processes also can present problems of uniformity in terms of distribution within the matrix of the element. Other methods, such as porous inclusion of a PCM into aggregates, produces a reduction of the strength of the composite, most likely related to a reduction of the bond between the treated aggregates and the matrix, which is possibly due to the reduction of aggregate porosity and/or the hydrophobic nature of the PCM.

In view of the above, it would be desirable if a process existed by which PCMs can be incorporated into construction materials with little or no significant detrimental effects on the mechanical performances of the construction materials to yield a variety of construction materials that are versatile in their applications.

BRIEF SUMMARY OF THE INVENTION

The intent of this section of the specification is to briefly indicate the nature and substance of the invention, as opposed to an exhaustive statement of all subject matter and aspects of the invention. Therefore, while this section is intended to be directed to and consistent with subject matter recited in the claims, additional subject matter and aspects relating to the invention are set forth in other sections of the specification, particularly the detailed description, as well as any drawings.

The present invention provides processes for incorporating phase change material (PCM) into porous construction elements, composite construction elements produced thereby, and structures constructed from such elements.

According to a nonlimiting aspect of the invention, a process of producing a construction element includes providing a pre-existing porous construction element that contains porosity, heating a PCM to a temperature at or above a melting temperature thereof to liquify the PCM and yield a liquid PCM, fully immersing the pre-existing construction element in the liquid PCM, and infiltrating the liquid PCM into the porosity of the pre-existing construction element while the pre-existing construction element and the liquid PCM are at a subatmospheric pressure level and at a temperature sufficient to maintain the PCM in a liquid state to yield a composite construction element in which the porosity of the construction element is at least partially filled with the PCM.

According to other nonlimiting aspects of the invention, composite construction elements produced according to the process described above are provided as well as structures built from such elements.

Technical aspects of the processes and products as described above preferably include the capability of producing construction elements to have a self-regulating thermal insulation to reduce energy consumption of a structure in which the elements are incorporated.

Other aspects and advantages of this invention will be appreciated from the following detailed description.

BRIEF DESCRIPTION OF THE DRAWINGS

FIGS. 3A, 3B, and 3C contain photographs depicting sectional views of three construction elements produced from a mortar mixture formed to have a water to cement ratio (w/c) of 0.65, wherein the elements have been infiltrated by a PCM (paraffin wax) by a process as represented in FIGS. 2A and 2C.

FIG. 4A schematically represents a sectional view of a porous construction element after infiltration by a PCM using a process as represented in FIGS. 2A and 2C, wherein the element contains an uneven distribution of the PCM in which the PCM is concentrated in surface regions of the element that are exposed to the liquid PCM during infiltration.

FIG. 4B schematically represents a sectional view of a porous construction element showing a PCM uniformly distributed throughout the interior of the element following a prior art method.

DETAILED DESCRIPTION OF THE INVENTION

Figure 1:
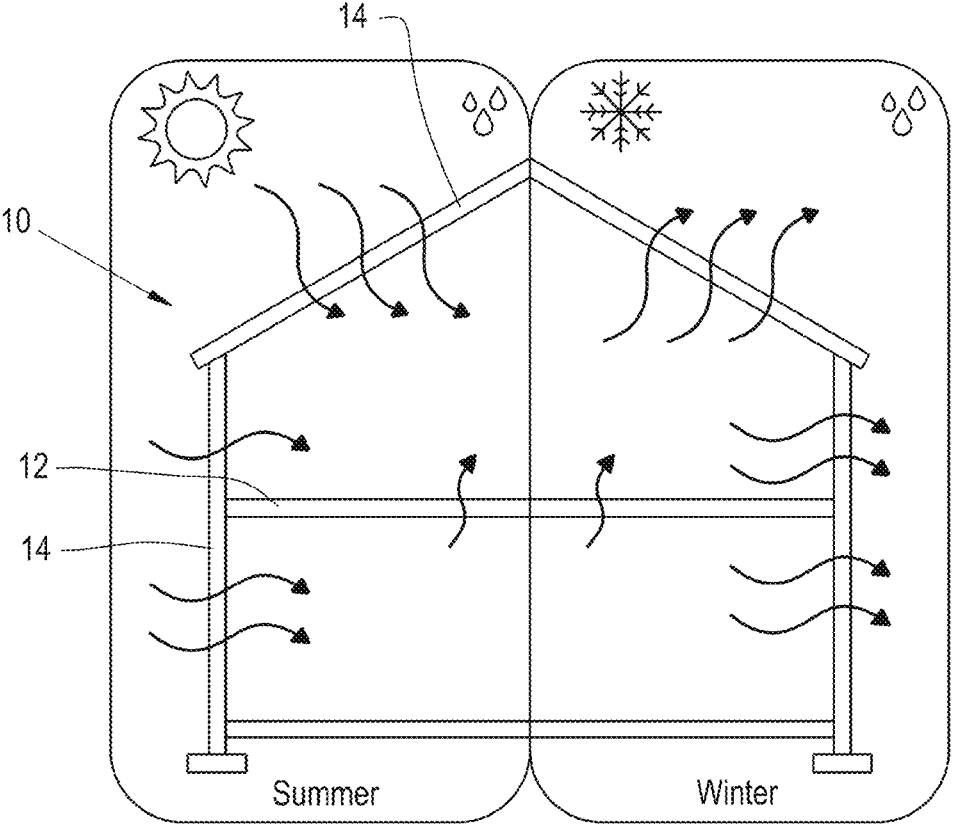
FIG. 1 schematically represents a building and the transfer of heat associated with heating and cooling the building, including heat transfer through exterior structures (e.g., walls and roof) that form the building envelope of the building.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) depicted in the drawings. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects described as part of different embodiments. Therefore, the appended claims, and not the detailed description, are intended to particularly point out subject matter regarded to be aspects of the invention, including certain but not necessarily all of the aspects and alternatives described in the detailed description.

The following disclosure describes processes for producing construction elements, which as used herein refers but is not limited to bricks, panels, blocks, preformed walls, drywall, ceiling panels, roof shingles, etc., used in building construction, pavers and other construction elements used in walkway construction, etc., to have the capability of self-regulating thermal insulation to reduce energy consumption or otherwise enhance thermal properties of structures. The following disclosure also describes construction elements produced by such processes, and structures built from such construction elements. The discussion refers to buildings and building envelopes (i.e., those parts of a building that separate the exterior of the building from its interior), such as the building 10 represented in FIG. 1, though it should be understood that these terms are used herein as a matter of convenience and broadly encompass a wide variety of constructions capable of being assembled and constructed from construction elements, including elements or materials that are not used as part of what would be considered a building envelope, such as, for example, gypsum boards.

Figure 2A:
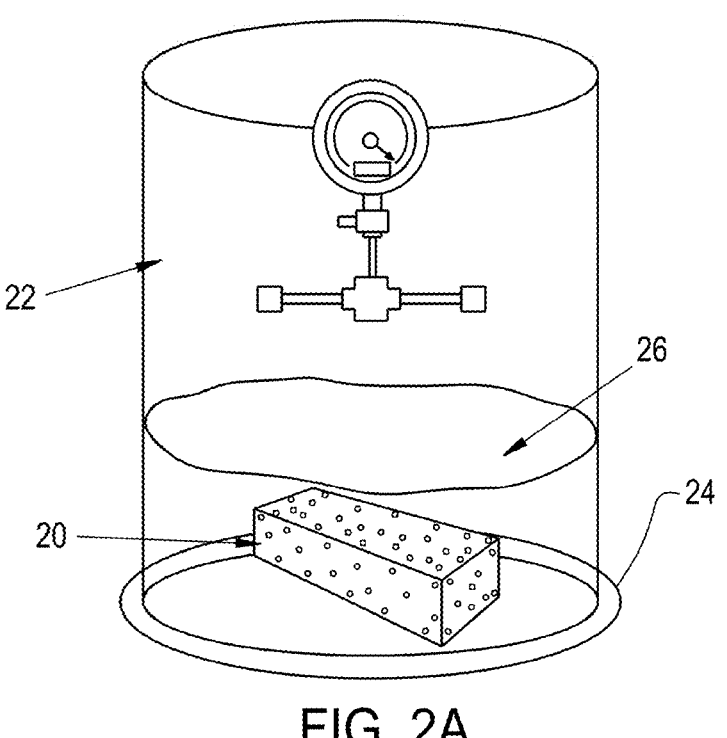
FIG. 2A schematically represents a vacuum chamber that contains a porous construction element immersed in a liquid phase change material (PCM).
Figure 2B:
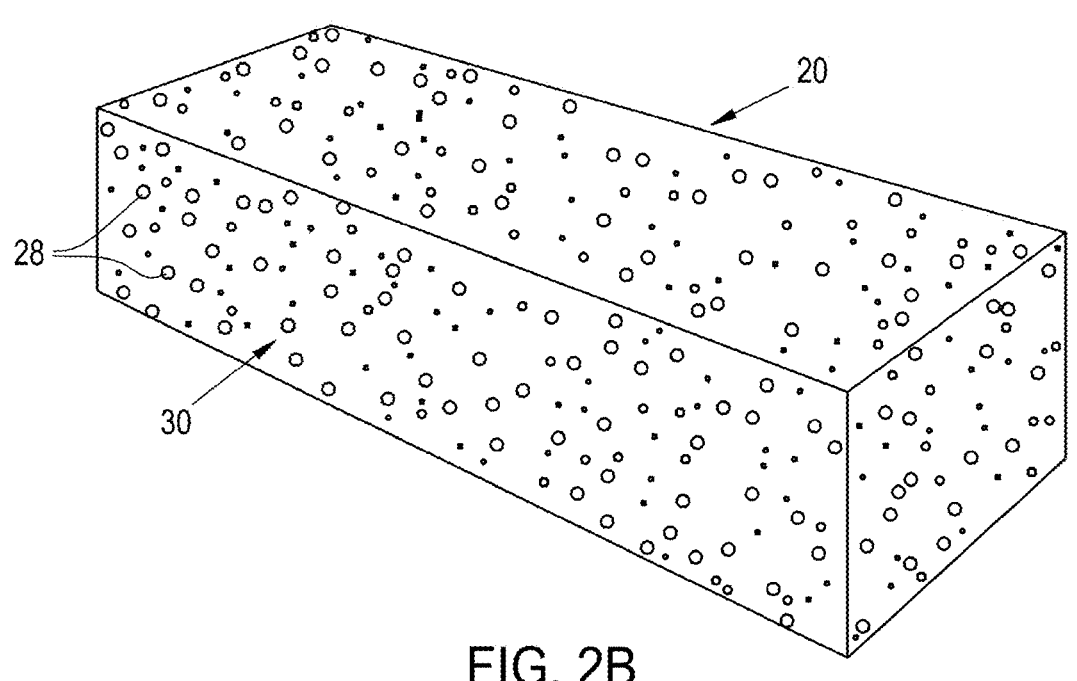
FIG. 2B is an enlarged schematic representation of the porous construction element of FIG. 2A and porosity of the construction element.
Figure 2C:
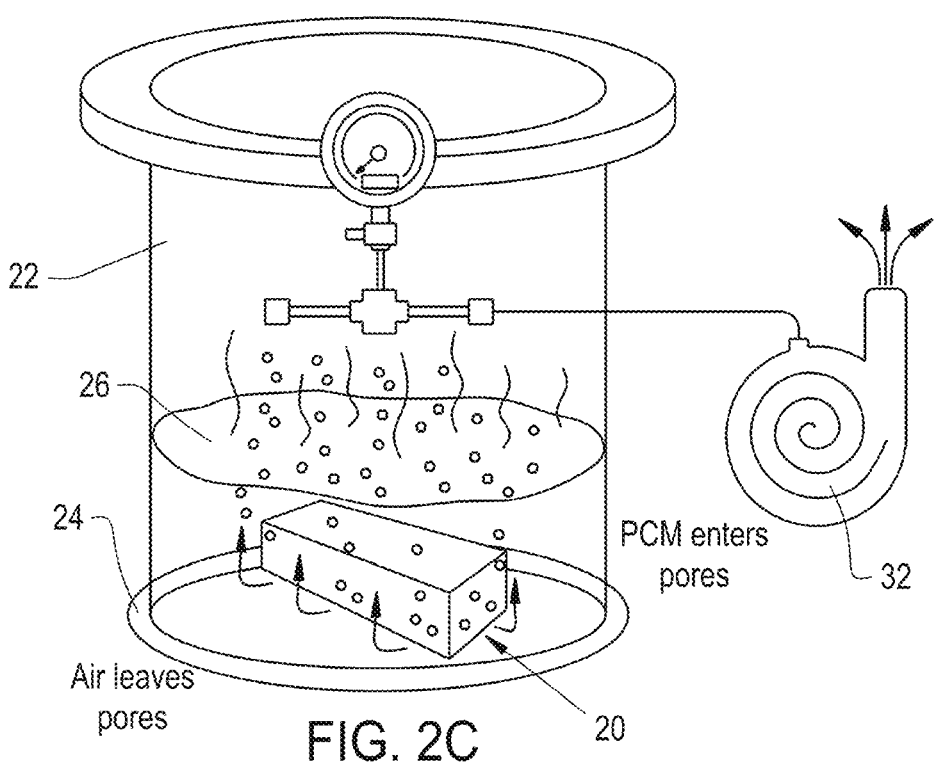
FIG. 2C schematically represents a process being performed within the vacuum chamber of FIG. 2A, during which a vacuum pump is used to create a subatmospheric pressure within the vacuum chamber to cause the liquid PCM to infiltrate into the porosity within the construction element.
Figure 2D:
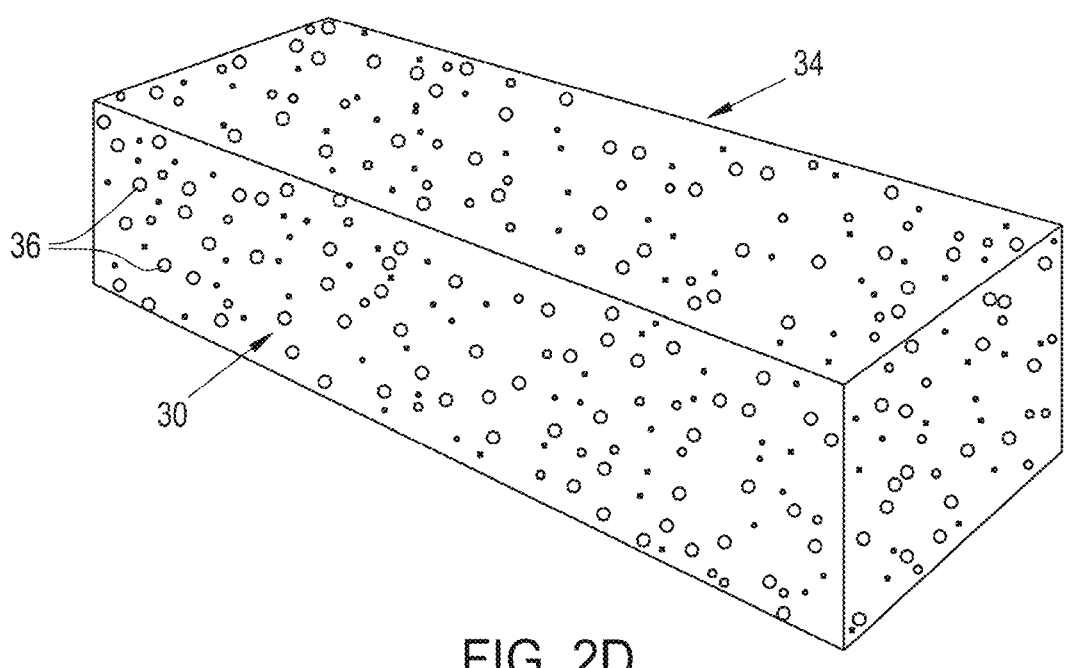
FIG. 2D schematically represents the construction element after infiltration with the PCM and solidification of the PCM.

FIGS. 2A through 2D schematically represent nonlimiting aspects of an embodiment of a process within the scope of the invention. As represented in FIG. 2A, the process generally entails providing a pre-existing construction element 20 that has relatively high porosity characterized by pores 28 within a solid portion 30 of the element 20 (FIG. 2B). A PCM within a chamber 22 is then heated (represented as effected by a heating pad 24) to a temperature at or above the melting temperature of the PCM to yield a liquid (molten) PCM 26, and the construction element 20 is fully immersed in the liquid PCM 26 while maintaining the construction element 20 and liquid PCM 26 at or above the melting temperature of the PCM, in other words, a temperature sufficient to maintain the PCM in a liquid state. In FIG. 2C, a vacuum pump 32 is represented as used to subject the immersed construction element 20 and liquid PCM 26 to a subatmospheric pressure level within the chamber 22 while maintaining the construction element 20 and liquid PCM 26 at or above the melting temperature of the PCM to cause the liquid PCM 26 to infiltrate at last some of the pores 28 of the construction element 20, thereby yielding a composite construction element 34 comprising PCM-filled pores 36 within and surrounded by the solid portion 30 (FIG. 2D). The composite construction element 34 produced by the process described above is capable of exhibiting increased thermal inertia as a result of the PCM-filled pores 36 within the element 34.

Figure 9:
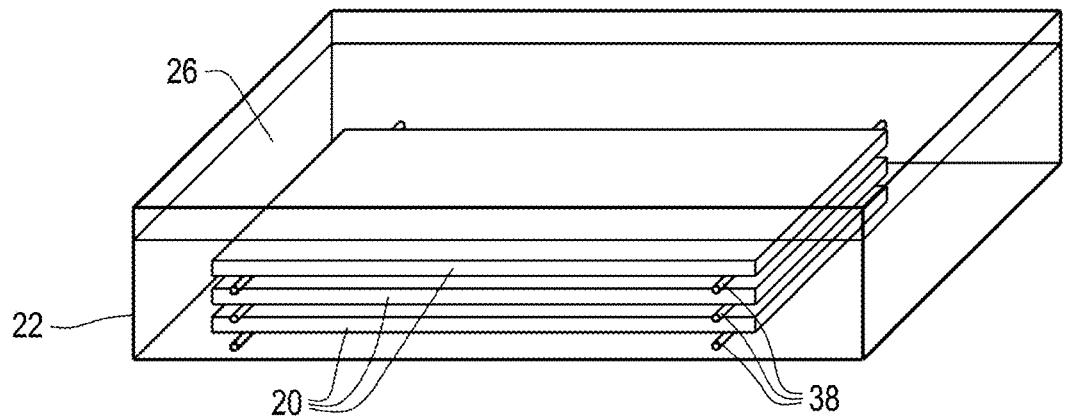
FIG. 9 schematically represents a vacuum chamber that contains multiple porous construction elements simultaneously immersed in a PCM.

While the element 20 and liquid PCM 26 are heated under subatmospheric pressure levels, the element 20 preferably remains completely submerged in the liquid PCM 26 such that excess liquid PCM 26 remains above the element 20 as the liquid PCM 26 infiltrates the element 20. As such, it will generally be advantageous to know the initial pore volume of the element 20, calculate the volume of PCM needed to fill a desired amount of the pores 28 within the element 20, and ensure that excess liquid PCM 26 will remain over the element 20 at the conclusion of the infiltration process. Furthermore, the element 20 may be elevated above the floor of the chamber 22, such as with rollers, beads, particulate matter, etc., to increase the surface area of the element 20 surrounded by the liquid PCM 26 to promote the distribution of the PCM within the composite construction element 36 and reduce process time. As an example, FIG. 9 schematically represents a vacuum chamber 22 that contains multiple porous construction elements 20 that are simultaneously immersed in a liquid PCM 26, with separators 38 (represented as cylindrical rods) being utilized to space the lowermost element 20 above the floor of the chamber 22 and utilized to space adjacent elements 20 apart from each other to reduce the contact surface areas between the elements 20 and the chamber 22 and increase the area of the elements 20 in contact with the liquid PCM 26. As evident from FIGS. 2A-2D and FIG. 9, chambers suitable for performing the infiltration process are not limited to any particular shape, size, or construction, and the adaptation of different chambers for particular types of construction elements is within the scope of the invention.

During investigations leading to the present invention, a construction element was observed during an infiltration process as described above in reference to FIGS. 2A through 2D. As air was extracted from the element while submerged in a liquid PCM under a subatmospheric pressure level, bubbles emerged from the element evidencing the removal of air from the porosity within the element and its replacement with liquid PCM. Once it was observed that no air bubbles were formed, the infiltration process was stopped. The element was then removed from the chamber and its exterior surfaces cleaned of excess PCM prior to the PCM becoming fully resolidified. Alternatively, while the element remains within the vacuum chamber at a subatmospheric pressure, the chamber may be allowed to cool to resolidify the PCM. Once the PCM resolidifies, the chamber can be returned to atmospheric pressure and the element removed from the solidified PCM in which it is encased. The preferred method of curing and extraction of the composite construction element will additionally be dependent upon the properties of the original element and the PCM used, as well as on any operational or economic factors considered by the operator of such a process.

Depending on the permeable porosity of the element, the intended application of the element, etc., a sealant paint or coating may be applied to the exterior surfaces of the PCM-infiltrated element to seal any surface pores. If a sealant is utilized, preferred characteristics and properties of a sealant material will typically depend on the particular intended application of the element.

As described above, the process of infiltrating a pre-existing construction element with a PCM to yield a composite construction element that exhibits high thermal inertia can be performed manually or may be automated. As non-limiting examples, temperature sensors and automatic switches may be utilized to control the vacuum, heating, and cooling processes, optionally to the extent that production of the composite construction elements can be automated for large scale production.

From the above, it should be appreciated that while previous studies have explored the positivity of incorporating a PCM in construction elements produced from concretes and other construction materials, such studies have incorporated the PCMs during the mixing process used to produce the construction materials and therefore prior to producing a construction element therefrom. Such approaches have resulted in issues concerning the strength and performance of the construction element. In contrast, by incorporating a PCM after a construction element is formed, the PCM does not negatively affect the hydration or hardening process of the matrix material of the element. Furthermore, processes as described herein reduce the porosity and permeability of the construction element relative to its as-manufactured condition prior to infiltration with the PCM. The result can potentially be higher strength and durability of the construction element. In addition, the infiltration process is capable of causing a PCM to penetrate very small pores and channels due to the vacuum process. As a result, the construction element (and building structures formed therefrom) and its properties will tend to be very stable because capillary forces and the solid nature of the PCM at standard operational temperatures reduce the likelihood of unintentional loss of the PCM from the interior of an element.

In addition to conventional construction materials used to produce bricks, concrete blocks, and other construction elements, the process disclosed herein can be used with a wide variety of other matrix materials to provide a more sustainable option, for example, using concrete blocks made with recycled aggregates, such as recycled concrete aggregates or other porous recycled aggregates, will provide the block with a higher porosity before the new method is applied. Thus, the element will have more capacity to store paraffin inside.] recycled aggregates such as recycled concrete aggregates or other porous recycled aggregates, which can be used to make cementitious eco-composites such as eco-concrete with greater porosity than standard concretes, thereby providing more capacity for infiltrated PCM and, therefore, higher improvement of the thermal inertia. Construction elements with tailored infiltrated PCM content are capable of exhibiting enhanced performance in terms of thermal insulation and temperature regulation of a building (i.e., more energy savings) and a reduced environmental footprint since recycled aggregates will lower the abiotic depletion of natural resources and the net waste generation associated with the production of the elements.

Similarly, a slag-based coating containing nanosized titania ($TiO_2$) may be used as a sealant so that the exterior of a construction element has a white color (or any other color as a result of adding a dye), thereby providing photocatalytic properties to the element as a result of the coating/sealant providing the ability to clean the air from certain pollutants.

In view of the above, it should be appreciated that a wide variety of construction elements can be manufactured to be infiltrated with a PCM in a manner capable of improving the energy performance of a building in which the elements are used, as well as promote various other environmentally benefits from a holistic perspective. The disclosed process and resulting products offer the potential for the construction of buildings having improved thermal performance, translating into a reduction of energy consumption, reduction of associated $CO_2$ emissions, and reduction of costs associated with heating and cooling buildings.

Further economic advantages are provided by the present invention, specifically that, because it can be employed to use common construction materials and PCMs, possibly concrete and paraffin wax, respectively, the material costs associated with such an advantageous process are not expected to rise dramatically. While the use of a vacuum chamber or bag may incur some cost to an operator, such mechanisms are simple, scalable, and easily procured. Methods of controlling temperature in the vacuum chamber are similarly common. Costs incurred by the process described herein may be easily offset by the cost savings incurred by the customer of such a product.

Nonlimiting aspects of the invention will now be described below in reference to further experimental investigations leading up to the invention.

In one experiment, paraffin wax was used as a PCM to infiltrate multiple porous clay bricks using the process described above. The paraffin was heated to a temperature at or above its melting temperature to liquify the paraffin, the bricks were preheated to temperatures at or above the melting temperature of the paraffin and fully immersed in the liquid paraffin, the liquid paraffin and bricks immersed therein were placed in a vacuum chamber, and then the chamber was evacuated to a subatmospheric pressure (vacuum) level while maintaining the liquid paraffin and immersed bricks at temperatures sufficient to maintain the paraffin in a liquid state so that the paraffin infiltrated porosity of the bricks. Each performed process yielded a composite brick with an increased thermal inertia.

The calculated density of the paraffin was 0.968 g/cm$^3$. The clay bricks were commercially obtained and substantially identical. For one exemplary brick infiltrated as described above, the brick was determined to have a saturated weight of 645.7 grams, a dry weight of 628.4 grams, a volume of 256 cm$^3$, a pore volume of 17.3 cm$^3$, and a porosity (% of total volume of the brick that is occupied by pores) of 6.76% prior to infiltration. After infiltration, the exemplary brick weighed 643.9 grams, the weight of the infiltrated paraffin was calculated to be 15.5 grams, the volume of the infiltrated paraffin was calculated to be 16.01 cm$^3$, the percent of the initial macro-pore volume of the brick that was filled with paraffin was calculated to be 92.56%, the final porosity of the paraffin-infiltrated brick was calculated to be less than 0.1%, and the total volume of the brick attributable to the paraffin was calculated to be 6.25%.

Prior to infiltration, the exemplary brick was determined to have a thermal inertia (TPS method) of 2101.70 Ws/Km$^2$. As infiltrated, the thermal inertia of the exemplary brick was 2224.79 Ws/Km$^2$, evidencing an increase in thermal inertia of +5.9%.

A second exemplary brick infiltrated as described above exhibited a peak load in flexural test of 4476 N, whereas a similar brick without infiltration of PCM exhibited a peak load in flexural test of 3999 N, evidencing that infiltration with the PCM is capable of increasing the peak load of the tested bricks by about 11.9%.

In view of the above, a process as disclosed herein was able to increase thermal inertia while also improving strength and reducing porosity of a commercially-available brick. The reduction of porosity will reduce infiltration of water and chemicals and, therefore, may enhance the durability of the brick. As such, it is possible that a construction element with a higher initial porosity may exhibit improvements in thermal inertial, strength, and durability and lower permeability as a result of the infiltration process.

In a second embodiment, mortars were made with Ordinary Portland Cement (OPC) Type 1 (CEM 1 52, 5 N-CP2) and quarzitic natural fine aggregate. To assess the role of initial porosity and test samples with different constituent ratios, three water to cement (w/c) ratios were selected: 0.45 w/c, 0.55 w/c, and 0.65 w/c, relating to low, intermediate, and high w/c, respectively, within common practice. Eighteen samples at each w/c ratio were produced, with nine used as reference samples and nine used as test samples. The PCM used in the study was a commercial paraffin wax with a reported melting point of 70° C. and a density of 0.968 g/cm$^3$.

The mortar samples were mixed, molded, hardened, and cured according to standard practice. The samples were dried and voided of water content, heated to a temperature of about 70° C., and then each individually placed inside a chamber that contained liquid paraffin wax at a temperature of about 70° C., such that the paraffin wax was not cooled by the samples. After this, the container was placed inside a vacuum chamber at 70° C., and the pressure inside the chamber was dropped to approximately −1 bar. The paraffin wax was allowed to infiltrate the porosity of the samples for a period of fifteen minutes, one hour, or four hours to achieve varying degrees of infiltration of the wax into the surface regions of the samples. After infiltration, the chamber valve was opened to return the samples to atmospheric pressure, the samples were removed from the container and allowed to cool so that the paraffin wax returned to a solid state.

The average porosities for the mortar samples produced with the three water to cement (w/c) ratios (0.45, 0.55, and 0.65 w/c) were 16.29%, 19.39%, and 21.85%, respectively. FIGS. 3A, 3B, and 3B depict sections of three samples produced at the water to cement (w/c) ratio of 0.65 (0.65 w/c) after infiltration for fifteen minutes, one hour, and four hours, respectively. FIGS. 3A, 3B, and 3C evidence an uneven distribution of the PCM within the cross-sections of the samples, namely, the PCM was concentrated in the surface regions of the samples and absent within interior regions of the samples surrounded by the infiltrated surface regions. The percentage of porosity of each sample in FIGS. 3A, 3B, and 3C filled with the paraffin wax was calculated to be 12.72%, 17.75%, and 33.03%, respectively, for the 0.65 w/c samples.

FIG. 4A schematically represents a cross-section of a porous construction element in which a PCM has infiltrated and is concentrated within surface regions of the element, essentially as occurred with the samples depicted in FIGS. 3A, 3B, and 3C. For contrast, FIG. 4B schematically represents a cross-section of a porous construction element in which a PCM is uniformly distributed throughout the cross-section of the element as a result of using a prior art PCM addition process.

Figure 5:
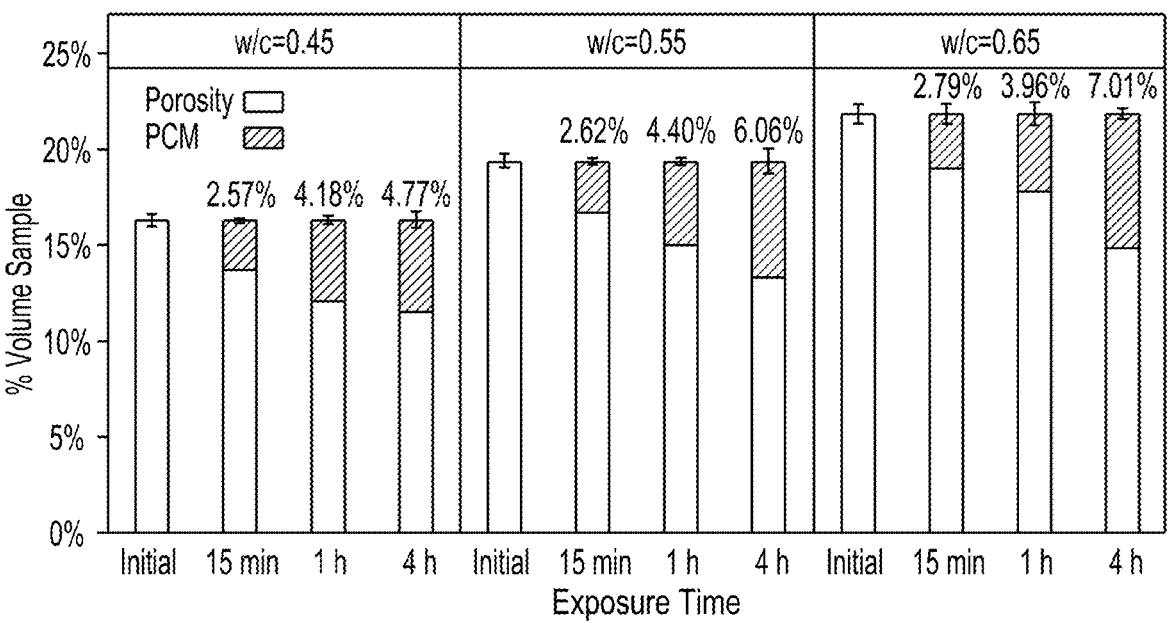
FIGS. 5, 6, 7, and 8 are graphs representing various properties of composite construction elements produced by infiltrating a PCM into porous construction elements by a process as represented in FIGS. 2A and 2C, wherein the elements originally contained different levels of porosity and were infiltrated by the PCM over different durations.

For mortar samples subjected to infiltration for fifteen minutes, the paraffin wax content in the samples slightly increased with increasing w/c as well as infiltration time, as shown in FIG. 5. The wax contents per sample volume for those samples infiltrated for fifteen minutes was 2.57%, 2.62%, and 2.79% for the 0.45, 0.55, and 0.65 w/c samples, respectively. This phenomenon also occurred for the samples infiltrated for one hour. As evident from FIG. 5, in mortar samples infiltrated for four hours, the initial porosities of the samples had a more prominent effect on the amount of wax infiltrated into the samples. The wax contents per sample volume for those samples were 4.77%, 6.06%, and 7.01% for the 0.45, 0.55, and 0.65 w/c samples, respectively. This might have been due to four hours being enough time for the paraffin to penetrate further through the pore structure of the mortar samples with higher porosity. In addition, the porosity of all samples was reduced proportionally to the amount of wax absorbed. Therefore, the porosity reduction was higher for higher w/c samples and longer infiltration times. For example, for the 0.65 w/c samples infiltrated for four hours, the final porosity value (14.83%) was lower than the final porosity of the one-hour and 0.55 w/c samples (14.99%). This suggested that, when infiltration occurred for a sufficient duration, the method used in this study to incorporate paraffin wax into a cementitious system can reduce the porosity of samples such that with lower cement content, the porosity results have a value similar to samples with higher cement content. This is not only beneficial in terms of sustainability, as less cement is required, but also in terms of the cost of the material.

At varying w/c's and varying durations of infiltration, the paraffin wax content percentage of the samples roughly increased with time and with porosity of the samples, constituting an average of 2.57% of the sample by volume in a 0.45 w/c sample infiltrated for fifteen minutes, while the 0.55 w/c and 0.65 w/c samples infiltrated for the same fifteen-minute duration presented respectively an average of 2.62% and 2.79% of PCM content. For those samples in which the one-hour infiltration process was applied, the average PCM contents for the 0.45, 0.55 and 0.65 w/c samples were 4.18%, 4.40% and 3.93%, respectively. The last percentage did not follow the trend, but the dispersion between samples was higher than in the rest of the testing. When the infiltration process was applied for four hours, the average PCM contents for the 0.45, 0.55 and 0.65 w/c samples were 4.77%, 6.06% and 7.01%, respectively.

Figure 6:
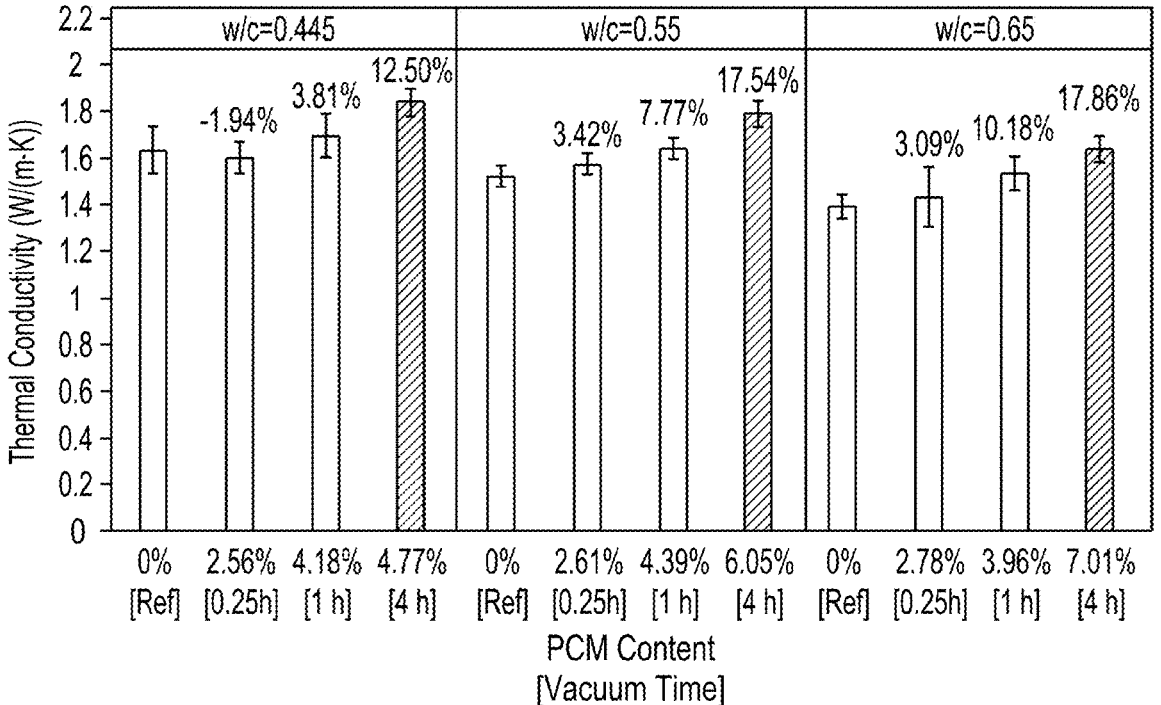
Figure 7:
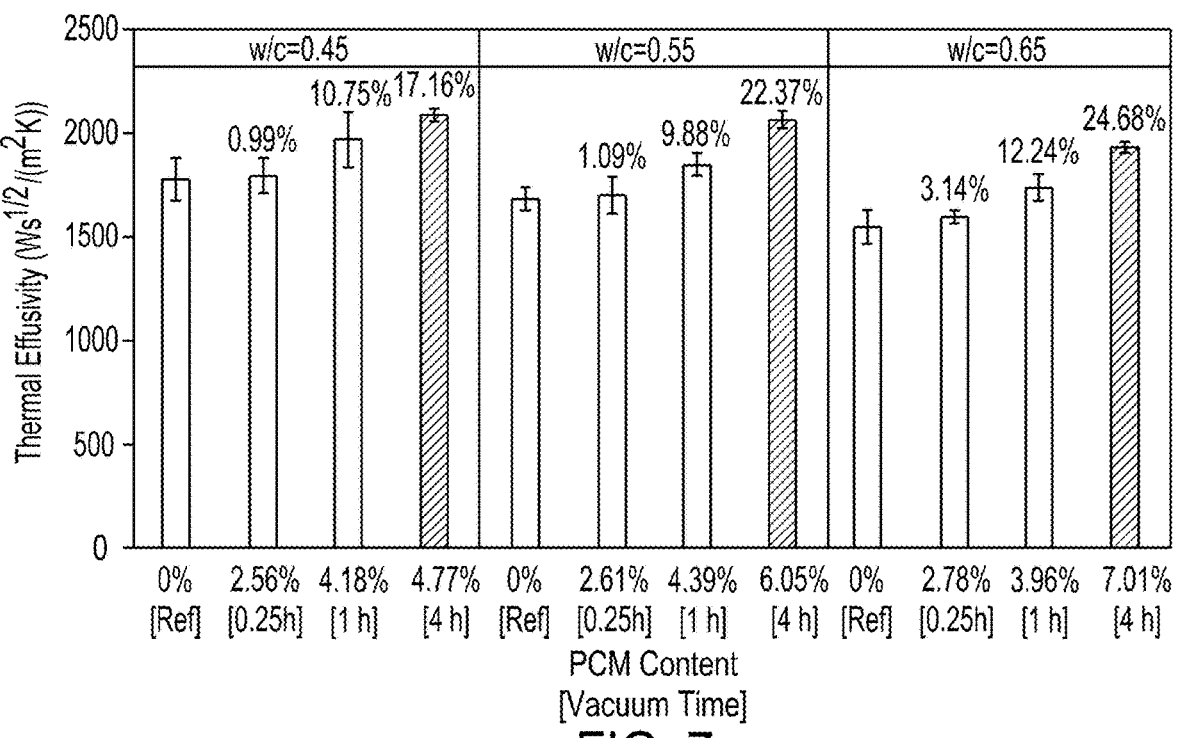

The samples exhibited improved thermal properties. As evidenced in FIG. 6, the 0.65 w/c samples showed increases of 3.09%, 10.18%, and 17.86% in thermal conductivity for infiltration durations of fifteen minutes, one hour, and four hours, respectively. The same samples exhibited increased thermal effusivities of 3.14%, 12.24%, and 24.68%, respectively, as seen in FIG. 7.

Figure 8:
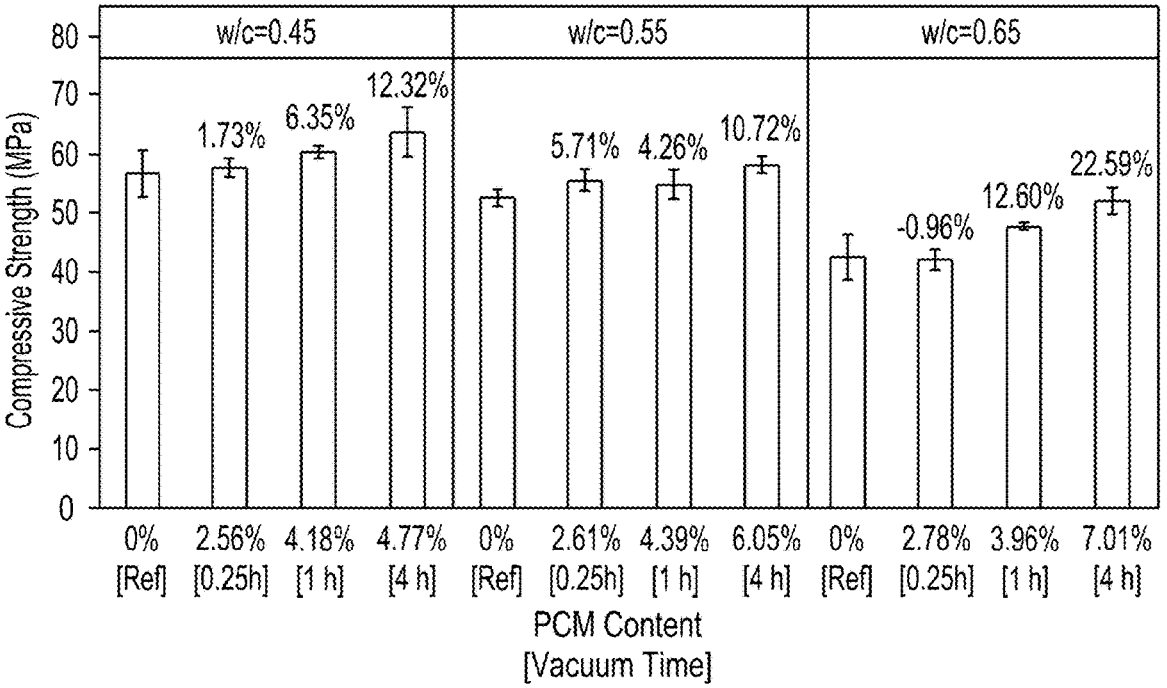

An unexpected advantage of the aforementioned process was the evidence of increases in compressive strength of the infiltrated (composite) samples. As evidenced in FIG. 8, samples produced with 0.45 w/c, 0.55 w/c, and 0.65 w/c compositions infiltrated for four hours saw average increases of 12.32%, 10.72%, and 22.59% in compressive strength, respectively, compared to the same corresponding mixtures with no PCM content.

From the foregoing, it can be seen that infiltration of a PCM into porous construction elements resulted in increases in thermal conductivity and effusivity and compressive strength in the construction elements. Maximum enhancements were observed in porous construction elements prepared with a constituent ratio (water to cement (w/c) ratio) of 0.65 w/c (21.85% porosity) subjected to four hours of infiltration with liquid PCM, which produced samples with the highest incorporated PCM (7.01% by sample volume and 33.03% of sample porosity and resulted in a maximum increase of 24.68% in thermal effusivity and 22.59% in compressive strength. Estimation models for the thermal properties and compressive strength were developed, showing high accuracy (errors lower than 10%) that enable the development of design systems to determine the initial porosity and PCM content required to obtain a desired combination of compressive strength and thermal conductivity or effusivity. The concentration of the PCM in the surface regions of the construction elements directly exposed to the liquid PCM resulted in an uneven distribution of the PCM that was concluded to be more effective in affecting the thermal properties because of the PCM being located in closer proximity to external surfaces of a building envelope constructed from the elements, resulting in more effective usage of the PCM.

As previously noted above, though the foregoing detailed description describes certain aspects of one or more particular embodiments of the invention and investigations associated with the invention, alternatives could be adopted by one skilled in the art. For example, construction elements could differ in appearance and construction from the embodiments described herein and shown in the drawings, the operation of certain components employed in the methods of producing the construction elements could be performed by components of different construction but capable of a similar (though not necessarily equivalent) function, and process parameters could be modified, and appropriate materials could be substituted for those noted. Furthermore, though paraffins ($C_nH_{2n+2}$) were investigated, it is foreseeable that other PCMs could be used, for example, other organic PCMs (e.g., other hydrocarbons, lipids, etc.) and inorganic PCMs (e.g., salt hydrates. As such, and again as was previously noted, it should be understood that the invention is not necessarily limited to any particular embodiment described herein or illustrated in the drawings. Finally, while the appended claims recite certain aspects believed to be associated with the invention as indicated by the investigations cited above, they do not necessarily serve as limitations to the scope of the invention.

The invention claimed is:

1. A process of producing a construction element, the process comprising:
   providing a pre-existing construction element that contains porosity;
   heating a PCM to a temperature at or above a melting temperature thereof to liquify the PCM and yield a liquid PCM;
   fully immersing the pre-existing construction element in the liquid PCM; and
   infiltrating the liquid PCM into the porosity of the pre-existing construction element while the pre-existing construction element and the liquid PCM are at a subatmospheric pressure level and at a temperature sufficient to maintain the PCM in a liquid state to yield a composite construction element in which the porosity of the pre-existing construction element is at least partially filled with the PCM, wherein the infiltration of the liquid PCM into the porosity of the pre-existing construction element is limited to surface regions of the pre-existing construction element exposed to the liquid PCM such that the PCM is concentrated in the surface regions and is not uniformly distributed within an interior of the composite construction element.

2. The process of claim 1, wherein the PCM is an organic hydrocarbon.

3. The process of claim 1, wherein the pre-existing construction element is chosen from the group consisting of bricks, panels, blocks, preformed walls, drywall, pavers, and roof shingles.

4. The process of claim 1, further comprising preheating the pre-existing construction element before the immersing step.

5. The process of claim 1, wherein the thermal inertia of the composite construction element is greater than the thermal inertia of the pre-existing construction element prior to the immersing step.

6. The process of claim 1, wherein the composite construction element exhibits lower porosity, lower permeability, higher durability, and equal or higher strength than the pre-existing construction element.

7. The process of claim 1, further comprising using a plurality of the composite construction elements as pavers to construct a walkway.

8. The process of claim 7, wherein the pavers reduce ice formation and improve durability and performance of the walkway.

9. The process of claim 1, further comprising using a plurality of the composite construction element to construct a building.

10. The process of claim 9, wherein the plurality of the composite construction element reduces heating and cooling energy usage of the building.

11. The process of claim 9, wherein the pre-existing construction element is formed of a recycled aggregate and the plurality of the composite construction element reduces an environmental footprint of the building.

12. The process of claim 1, wherein the pre-existing construction element is composed at least partially of Portland cement.

13. The process of claim 12, wherein the pre-existing construction element has a water-to-cement ratio between 0.45 and 0.65.

14. The process of claim 13, wherein the pre-existing construction element is immersed for about 15 minutes to 4 hours.

15. The process of claim 1, wherein the pre-existing construction element is at least partially of quarzitic natural fine aggregate.

16. The process of claim 1, wherein the pre-existing construction element is heated to the same temperature as the PCM before being immersed in it.

\* \* \* \* \*